United States Patent Office 3,351,592
Patented Nov. 7, 1967

3,351,592
AROMATICALLY SUBSTITUTED 4,4'-BIS-
TRIAZINYLSTILBENES
Adolf Emil Siegrist, Basel, Erwin Maeder, Aesch, Basel-Land, Peter Liechti, Binningen, and Leonardo Guglielmetti, Basel, Switzerland, assignors to Ciba Limited, Basel, Switzerland, a company of Switzerland
No Drawing. Filed Sept. 14, 1965, Ser. No. 487,306
Claims priority, application Switzerland, Sept. 23, 1964, 12,362/64
7 Claims. (Cl. 260—240)

ABSTRACT OF THE DISCLOSURE

The compounds of this invention are aromatically substituted 4,4' - bis - triazinylstilbenes which may be represented by the formula

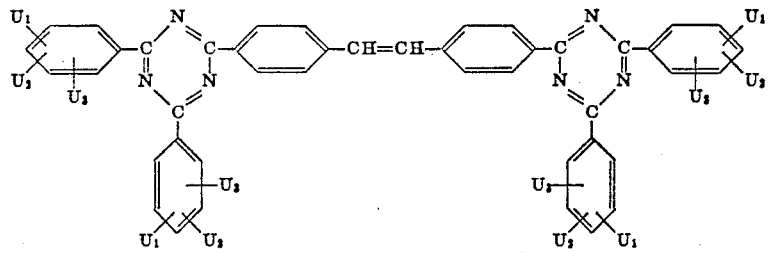

where $U_1$ represents a hydrogen atom, a halogen atom such as fluorine or especially chlorine, a branched or linear alkyl group which advantageously contains no more than 18 carbon atoms, a lower alkoxy group containing up to 4 carbon atoms, a free or neutralized sulfonic acid group, a sulfonamide group which may carry an organic substituent on the nitrogen, or a radical of the formula

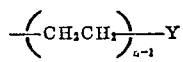

(where $n=1$ or 2, and Y represents a free or neutralized carboxyl group (—COOcation) or a carbonamide group which may carry an organic substituent on the nitrogen), $U_2$ represents a hydrogen atom, a halogen atom, a branched or linear alkyl group which advantageously contains no more than 18 carbon atoms, or a lower alkoxy group containing 1 to 4 carbon atoms, and $U_3$ represents a hydrogen atom, a halogen atom or a lower alkyl group containing up to 4 carbon atoms.

The compounds of this invention are especially useful as optical brighteners for organic materials.

The present invention provides valuable, new 4,4'-bis-triazinylstilbenes of the general formula (1) 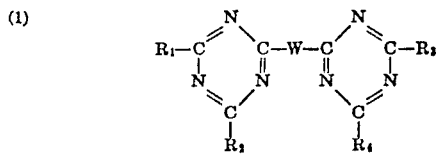

where $R_1$ to $R_4$ are identical or different and each represents an aryl or aralkenyl radical or a heterocyclic radical of aromatic nature, and W stands for a stilbene radical bound in positions 4 and 4' with the triazine rings.

Suitable aryl radicals are, for example, those of the naphthalene series or especially of the benzene series; particularly suitable aralkenyl radicals are styryl radicals whose benzene nucleus may be substituted, and suitable heterocyclic radicals of aromatic nature are in the first place pyridine radicals and also furan and thiophene radicals.

From among the new 4,4'-bis-triazinylstilbenes of the Formula 1 there may be specially mentioned, for example, those of the formula (2) 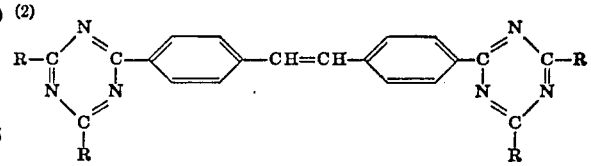

(where R represents a benzene radical) and among these 4,4'-stilbene derivatives above all those of the formula

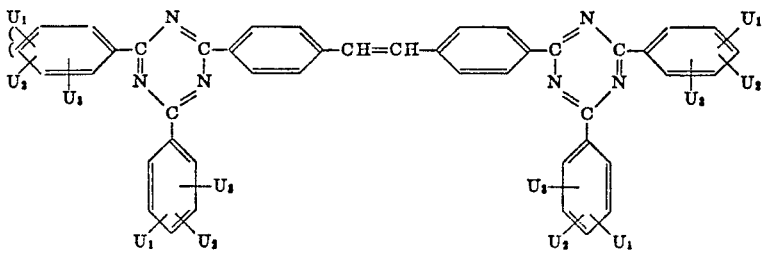

where $U_1$ represents a hydrogen atom, a halogen atom such as fluorine or especially chlorine, a branched or linear alkyl group which advantageously contains no more than 18 carbon atoms, for example methyl, ethyl, propyl, isopropyl, butyl, isobutyl, tertiary butyl, isoamyl, n-hexyl, n-octyl, 2-ethylhexyl, n-nonyl, n-dodecyl, n-octadecyl, or a radical of the formula (4) 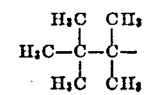

or (5) 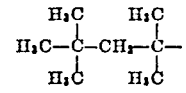

a lower alkoxy group containing up to 4 carbon atoms, for example methoxy, ethoxy, n-propoxy, isopropoxy, n-butoxy or tertiary butoxy, a phenyl group, a free or neutralized sulfonic acid group (—SO₃H, a salt of ammonium, of an alkali metal, alkaline earth metal or amine), a sulfonamide group which may carry an organic substituent on the nitrogen, or a radical of the formula

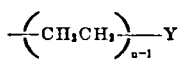

(where $n=1$ or 2, and Y represents a free or neutralized carboxyl group (—COOcation) or a carbonamide group which may carry an organic substituent on the nitrogen), $U_2$ represents a hydrogen atom, a halogen atom, a branched or linear alkyl group which advantageously contains no more than 18 carbon atoms, or a lower alkoxy group containing 1 to 4 carbon atoms, and $U_3$ represents a hydrogen atom, a halogen atom or a lower alkyl group containing up to 4 carbon atoms.

Special preference is given to those compounds of the above composition which correspond to the formula

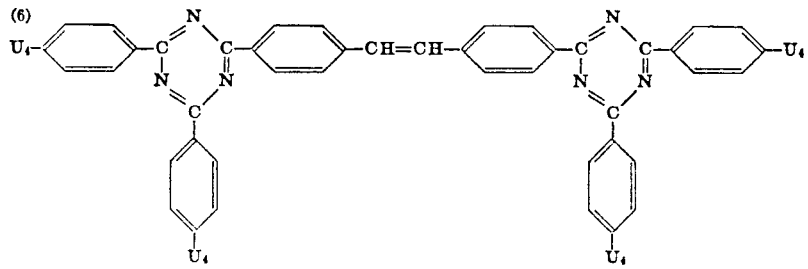

where $U_4$ represents a hydrogen atom, a halogen atom, an alkyl group containing 1 to 8 carbon atoms, or an alkoxy group containing 1 to 4 carbon atoms. Of practical value, especially insofar as the ease of their preparation is concerned, are those compounds of the Formulae 3 and 6 which are symmetrical with respect to the central ethylene double bond.

The new 4,4'-bis-triazinylstilbene compounds of the Formulae 1, 2, 3 and 6 can be prepared by various known methods.

The 4,4'-bis-triazinylstilbenes of the above-defined composition are obtained, for example, by heating a mixture of sulfur and a suitably substituted 1,3,5-triazine, which carries in position 6 a para-methylphenyl group, at a temperature above 250° C., preferably at about 270 to about 320° C., until the evolution of hydrogen sulphide has ceased. This process can be represented, for example for the preparation of the stilbene derivatives of the Formula 2, by the following diagram:

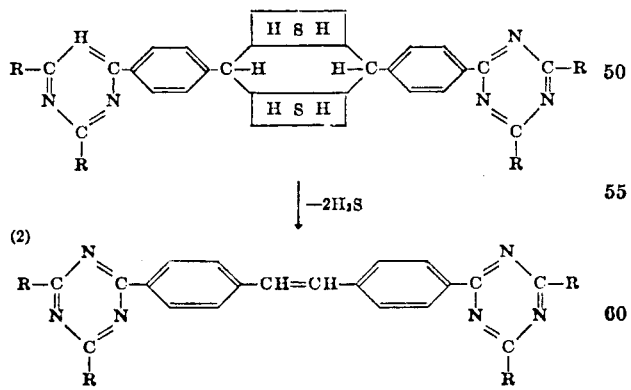

A preferred process for the manufacture of new 4,4'-bis-triazinylstilbene compounds consists essentially in reacting in an anhydrous medium, with the aid of a Friedel-Crafts catalyst such as aluminum chloride (or preferably aluminum chloride and thionylchloride) in the molecular ratio of 1:4 a stilbene-4,4'-dicarboxylic acid halide, especially chloride, in the presence of a non-polar or weakly polar inert organic solvent (e.g. ortho-dichlorobenzene or tetrachloroethylene) at a temperature in the vicinity of the boiling point of the reaction mixture, that is to say at about 70 to 130° C., with a suitable nitrile, especially an aromatic nitrile R—C≡N (where R represents a benzene radical) [cf. Berichte, 89, page 223 (1956)] and the intermediate thus obtained, if desired or required after first having been isolated, is treated with ammonium chloride at a temperature from about 70 to 130° C. [cf. J. Chem. Soc. 1941, pages 278 to 282]. This reaction sequence can be represented for instance for the preparation of the new compounds of the Formula 2, by the following diagram:

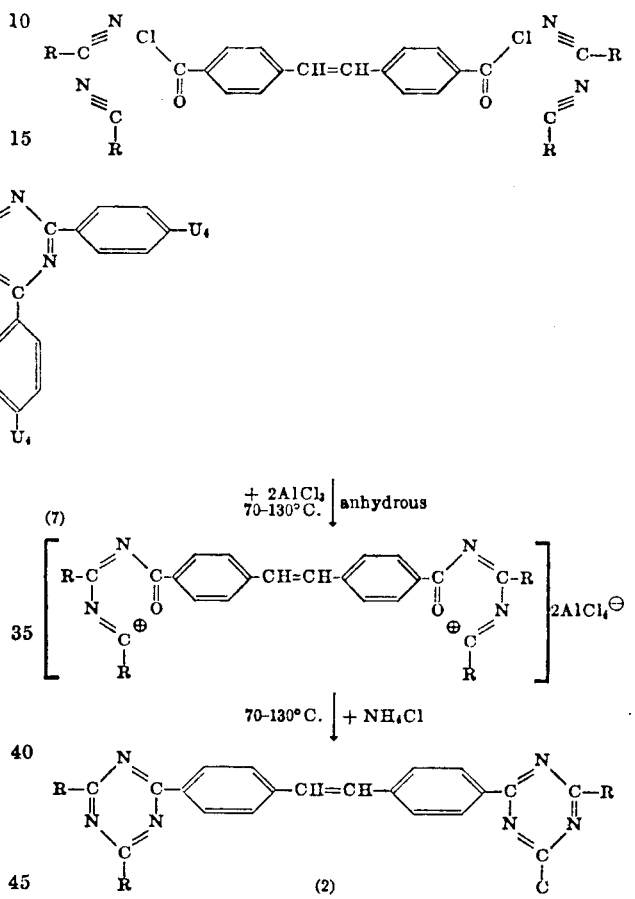

The 4,4'-bis-triazinylstilbenes of the Formula 1 or 2 obtained by the process described lend themselves to further reactions. Thus, water-soluble derivatives are obtained when (a) one or several primary or secondary amino groups of the stilbene derivative of the Formula 1 or 2 is converted with sultones, e.g. with propanesultone or butanesultone at an elevated temperature into the corresponding alkylsulfonic acid derivative;

(b) one or several primary amino groups of the stilbene derivative of the Formula 1 or 2 are converted with aldehyde-bisulphite compounds e.g. with formaldehyde-alkali metal bisulphite, into the corresponding ω-methanesulfonic acid derivative;

(c) one or several primary amino groups of the stilbene derivative of the Formula 1 or 2 are reacted with alkylsulfonic or aralkylsulfonic acids, e.g. bromoethanesulfonic acid or benzylchloridesulfonic acid;

(d) one or several primary or secondary amino groups or hydroxyl groups of the stilbene derivative of the Formula 1 or 2 are linked through s-triazin-2-yl bridges with phenolsulfonic acids or anilinesulfonic acids;

(e) in one or several hydroxyl groups of the stilbene derivative of the Formula 1 or 2 a polyalkylene ether chain sufficiently long for solubility in water is introduced by means of an alkylene oxide such as ethylene oxide or propylene oxide or with a polyalkylene ether monohalide;

(f) one or several groups capable of quaternation present in the stilbene derivative of the Formula 1 or 2 are reacted with quaternating agents e.g. methyliodide, dimethylsulfate, benzylchloride or toluenesulfonic acid alkyl esters at an elevated temperature, if necessary under superatmospheric pressure;

(g) one or several halogenoalkyl groups of the stilbene derivative of the Formula 1 or 2 are converted into the corresponding quaternary derivative with tertiary bases e.g. pyridine.

The new optical brighteners of the composition defined above display in the dissolved or finely dispersed state a more or less pronounced fluorescence. They may be used for optically brightening a wide variety of organic materials of high or low molecular weight or materials containing organic substances.

As relevant examples the following groups of organic materials suitable for optical brightening may be mentioned, without thereby in any way restricting the possible scope.

(I) Synthetic organic materials of high or low molecular weight:

(a) Polymers based on organic compounds containing at least one polymerizable carbon-to-carbon double bond, i.e. their homopolymers and copolymers and products obtained by after-treating them, such as crosslinked, grafted or decomposition products, polymer dilutions or the like; relevant examples are: Polymers based on $\alpha,\beta$-unsaturated carboxylic acids and their derivatives, of olefinic hydrocarbons, polymers based on vinyl and vinylidene compounds of halogenated hydrocarbons, of unsaturated aldehydes and ketones or their modified products.

(b) Other polymers accessible, for example, by ring opening e.g. polyamides of the polycaprolactam type; furthermore formaldehyde polymers or polymers accessible by polyaddition as well as by polycondensation.

(c) Polycondensation products or precondensates based on bifunctional or polyfunctional compounds containing condensable groups, their homo- and co-condensates and products obtained by after-treating them; relevant examples are: Polyesters, saturated or unsaturated, linear or branched polyamides; maleinate resins, melamine resins, phenolic resins (novolaks), aniline resins, furan resins, carbamide resins and their precondensates, and similarly constituted products, polycarbonates, silicone resins and other.

(d) Polyadducts such as polyurethanes, epoxy resins.

(II) Semisynthetic organic materials e.g. cellulose esters or mixed esters, nitrocellulose, cellulose ethers, regenerated cellulose or products obtained by after-treating them, casein plastics.

(III) Natural organic materials of animal or vegetable origin, e.g. based on cellulose or proteins such as finely dispersed wood masses, natural resins; furthermore rubber, gutta percha, balata and products obtained by aftertreating or modifying them.

The organic materials that can be optically brightened may be at any stage of their processing (raw materials, semi-finished products or finished articles) and pyhsical states. They may be in the form of structures of any desired shape, that is to say, for example, they may be predominantly three-dimensional bodies such as blocks, plates, sections, pipes, injection mouldings or components of any desired kind, chips or granulates, foamed articles; predominantly two-dimensional bodies such as films, foils, lacquers, tapes, coatings, impregnations or coatings; or predominantly unidimensional bodies such as filaments, fibers, flocks, bristles or wires. The said materials may also be as yet not shape and be in the most varied homogeneous and inhomogeneous forms of dispersion and physical states, for example in the form of powders, solutions, emulsions, dispersions, latices (e.g. lacquer solutions, polymer dispersions), sols, gels, putties, pastes, waxes, adhesives, pore fillers or the like.

Fibrous materials may, for example, take the form of continuous filaments, staple fibers, flocks, hanks, textile threads, yarns, double yarns, fiber fleeces, felts, cottonwood, flocculated products or of textile fabrics or textile laminates, knitwear, of papers, cardboards, paper pulps or the like.

The compounds to be used according to this invention are of special value for the treatment of textile organic materials, especially woven textile fabrics. If fibers—which may be staple or continuous filaments, in the form of hanks, woven or knitted fabrics, fleeces, flocculated substrates or laminates—are to be optically brightened by the present process, this is advantageously done in an aqueous medium in which the chosen compound is finely dispersed (suspended or, if desired, dissolved). If desired, there may be added to the treatment liquor a dispersant, for example soaps, polyglycols ethers of fatty alcohols, fatty amines or alkylphenols, cellulose sulphite waste liquor or condensation products of (possibly alkylated) naphthalenesulfonic acids with formaldehyde. It has been found particularly advantageous to work in a neutral, weakly alkaline or acid bath. Likewise, it is advantageous to perform the treatment at a temperature from about 50 to 100° C., for example at the boiling temperature of the bath or in its vicinity (at about 90° C.). The improving treatment according to this invention may also be carried out with solutions in organic solvents.

Furthermore, the new optical brighteners to be used in this invention may with special advantage be added to, or incorporated with, the materials—especially saturated polyesters, polyamides or poly-$\alpha$-olefines—before or during their shaping. Thus, for example, in the manufacture of films, foils, tapes or mouldings they may be added to the mouldings or injection moulding composition or they may be dissolved, dispersed or in any other way finely distributed in the spinning mass before spinning. The optical brighteners may also be added to the starting materials, reaction mixtures or intermediate products used to produce fully synthetic or semi-synthetic organic materials, that is to say also before or during the chemical reaction, e.g. a polycondensation (including the precondensates), a polymerization (including the prepolymers) or a polyaddition.

The new optical brighteners can, of course, also be used whenever organic materials of the kind indicated above are combined with inorganic materials in any desired form (typical examples: detergents, white pigments in organic substances).

The new optical brighteners are distinguished by their particularly good heat resistance and fastness to light and to migration.

The amount of the new optical brighteners to be used according to this invention, referred to the weight of the material to be optically brightened, may vary within wide limits. Even very small amounts, in some cases for instance as little as 0.001% by weight, may suffice to produce a distinct and durable effect, though it is also possible to use amounts of up to about 0.5% by weight or more. For most practical purposes an amount ranging from 0.005% to 0.2% by weight will be preferred.

The new compounds, to be used as brightening agents, may also be applied, for example, as follows:

(a) In admixture with dyestuffs or pigments or as additives to dyebaths, or printing, discharge or reserve pastes. Also for after-treating dyeings, prints or discharge prints.

(b) In admixture with so-called "carriers," antioxidants, light filters, heat stabilizers, chemical bleaches or as additives to bleaching baths.

(c) In admixture with cross-linking agents, dressings such as starch or synthetic dressings. It may be of advantage to add the products of this invention to the liquors used for producing an anti-crease finish.

(d) In combination with detergents. The detergent and the optical brightener may be added separately to the washing liquor. It is also advantageous to use detergents that as such already contain a share of brightening agent. Suitable detergents are e.g. soaps, salts of sulfonate washing agents e.g. salts of sulfonated benzimidazoles substituted on the carbon atom 2 by higher alkyl radicals, also salts of monocarboxylic acid esters of 4-sulfophthalic acid with higher fatty alcohols, also salts of fatty alcohol sulfonates, alkylarylsulfonic acids or condensation products of higher fatty acids with aliphatic hydroxysulfonic or aminosulfonic acids. Furthermore, there may be used non-ionic detergents e.g. polyglycol ethers derived from ethylene oxide and higher fatty alcohols, alkylphenols or fatty amines.

(e) In combination with polymeric vehicles (polymers, polycondensates or polyadducts) in which the brightening agent, if desired in addition to other substances, is incorporated in the dissolved or dispersed form, for example in the case of coating, impregnating or binding agents (solutions, dispersions, emulsions) for textile materials, fleeces, papers or leathers.

(f) As additives to a wide variety of industrial products to improve their presentation or to obviate disadvantanges in their use, for example as additives to glues, adhesives, paints or the like.

The compounds of the above formulae can also be used as scintillators, for various photographic purposes, such as electrophotographic reproduction or for supersensitizing.

If the brightening operation is to be combined with other treating or improving operations, the combined treatment is advantageously performed with the use of a suitable stable preparation which contains in addition to optically brightening compounds of the above general formula also dispersants, detergents, carriers, dyestuffs, pigments or dressing agents.

For treating polyester fibers with the brighteners of this invention these fibers may be impregnated, for example, with an aqueous dispersion of the brightener at a temperature below 75° C., e.g. at room temperature, and then subjected to a dry heat treatment at a temperature above 100° C. In general, it is of advantage first to dry the impregnated fibrous material at a moderately raised temperature, e.g. at a temperature from at least 60° C. to about 100° C. The heat treatment of the dry material is then advantageously carried out at 120 to 225° C., for example by heating in a drying chamber, by ironing within the indicated temperature range or by treatment with dry, superheated steam. If desired, the drying and the dry heat treatment may follow immediately upon each other or they may be performed in a single stage.

EXAMPLE 1

14.46 grams of stilbene-4,4'-dicarboxylic acid dichloride and 30.9 g. of benzonitrile are pasted in 200 ml. of dry ortho-dichlorobenzene; 13.3 g. of anhydrous aluminum chloride are added and after the exothermic reaction has subsided the temperature of the reaction mixture is adjusted to 120° C. After addition of 10.6 g. of ammonium chloride the batch is stirred for 15 hours at 120° C., cooled, poured into much cold water, washed neutral, freed from ortho-dichlorobenzene by means of steam and dried, to yield about 24 g. of a yellow powder which melts above 350° C. After repeated recrystallization from ortho-dichlorobenzene with the aid of bleaching earth 4,4'-bis-[2'',4''-phenyl-1'',3'',5''-triazin-6''-yl]-stilbene of the formula

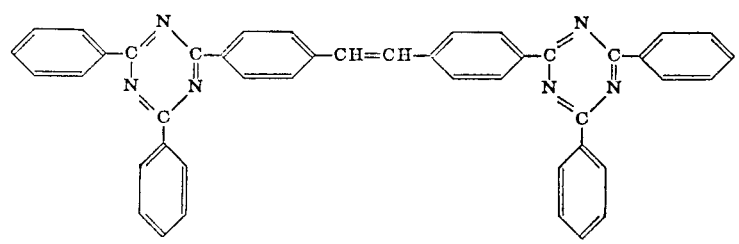

(8)

is obtained in the form of small, light-yellow needles melting above 390° C.

Analysis.—$C_{44}H_{30}N_6$, mol. weight, 642.77. Calculated: C, 82.22; H, 4.70; N, 13.08%. Found: C, 81.98; H, 4.92; N, 13.28%.

EXAMPLE 2

A melt is prepared from 64.7 g. of 2,4-diphenyl-6-(4'-methylphenyl)-1,3,5-triazine of the formula (9)

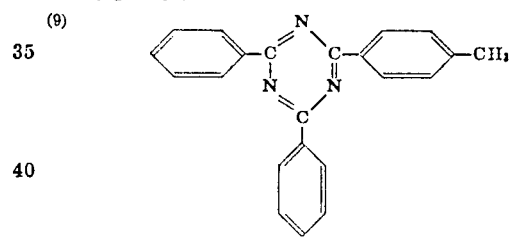

and 3.2 g. of sulfur and stirred for 45 to 60 minutes at 290 to 300° C. When the evolution of hydrogen sulphide has ceased, the melt is allowed to cool and during this time it is dissolved in 100 ml. of ortho-dichlorobenzene and 100 ml. of tetrachloroethylene. The batch is cooled to room temperature (about 18° C.), the precipitated crystalline reaction product is suctioned off, washed with tetrachloroethylene and dried. Yield: about 24 g. of a brownish yellow powder which after repeated recrystallization from ortho-dichlorobenzene with the aid of bleaching earth furnishes the compound of the Formula 8 in the form of light-yellow crystals melting above 390° C.

$C_{44}H_{30}N_6$, mol. weight, 642.77. Calculated: C, 82.22; H, 4.70; N, 13.08%. Found: C, 81.68; H, 4.84; N, 12.81%.

When 2,4-diphenyl-6-(4'-methylphenyl)-1,3,5-triazine of the Formula 9 is replaced by an equimolecular amount of 2,4,6-tri-(4'-methylphenyl)-1,3,5-triazine, the compound of the formula (10)

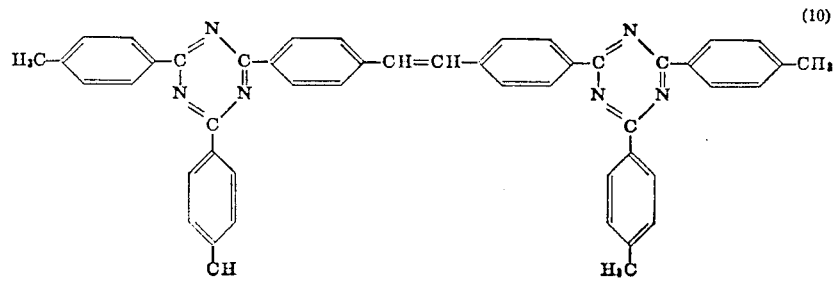

is obtained in the form of very fine, light-yellow needles (from tetrachloroethylene) melting at 359.5 to 361° C.

$C_{48}H_{38}N_6$, mol. weight, 698.83. Calculated: C, 82.49; H, 5.48; N, 12.03%. Found: C, 82.27; H, 5.60; N, 11.84%.

1″,3″,5″-triazin-6″-yl]-stilbene of the Formula 10 in the form of fine, light-yellow needles melting at 374 to 376° C.

The following 4,4′-bis-triazinylstilbene derivatives are accessible in a similar manner:

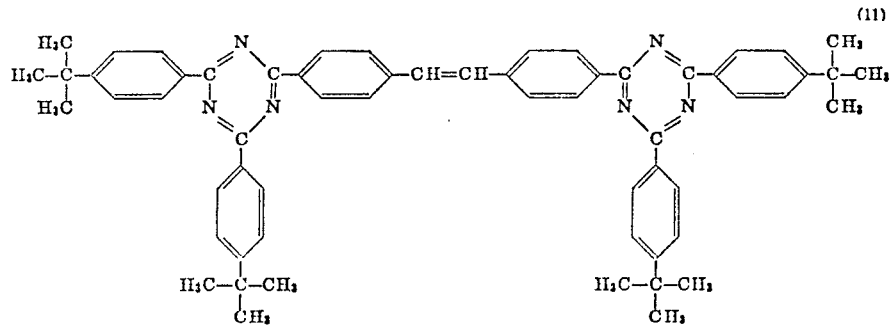

(11)

EXAMPLE 3

28.9 grams of stilbene-4,4′-dicarboxylic acid dichloride, 58.5 g. of para-tolunitrile and 20 ml. of thionyl-chloride are pasted in 400 ml. of anhydrous ortho-dichlorobenzene; 26.6 g. of anhydrous aluminum chloride are added, and after the exothermic reaction has subsided the temperature is adjusted within about 30 minutes to 95 to 100° C. The reddish brown reaction solution is then stirred for another 2 hours at this temperature. 21.2 grams of ammonium chloride are then added, the reaction temperature is raised to 130° C., and the batch is stirred for about 15 hours longer at this temperature. The cooled reaction mixture is poured into much cold water, washed neutral, the ortho-dichlorobenzene removed by means of steam, and the residue is dried, to yield about 61.1 g. (=87.4% of theory) of a beige-colored powder melting above 350° C. After two recrystallizations from ortho-dichlorobenzene with the aid of bleaching earth there are obtained 40.8 g. of 4,4′-bis[2″,4″-di-para-tolyl- Yield (crude): 80.4% of theoretical. Fine, yellow needles from tetrachloroethylene, melting above 420° C.

$C_{60}H_{62}N_6$, mol. weight, 867.20. Calculated: C, 83.10; H, 7.21; N, 9.69%. Found: C, 83.03; H, 7.28; N, 9.87%.

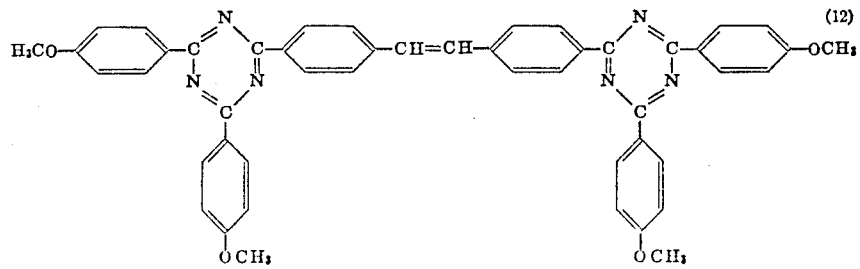

(12)

Yield (crude): 85.5% of the theoretical. Finely crystalline, light-yellow powder from ortho-dichloro-benzene, melting at 306 to 307° C.

$C_{48}H_{30}O_4N_6$, mol. weight, 762.83. Calculated: C, 75.57; H, 5.02; N, 11.02%. Found: C, 75.27; H, 5.10; N, 10.93%.

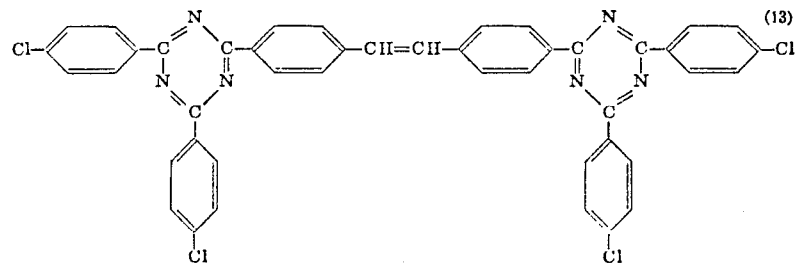

(13)

Yield (crude): 82.5% of the theoretical. Finely crystalline, light-yellow powder from ortho-dichlorobenzene, melting at 373–374° C.

$C_{44}H_{26}H_6Cl_4$, mol. weight, 780.55. Calculated: C, 67.71; H, 3.39; Cl, 18.17%. Found: C, 67.70; H, 3.39; Cl, 17.96%.

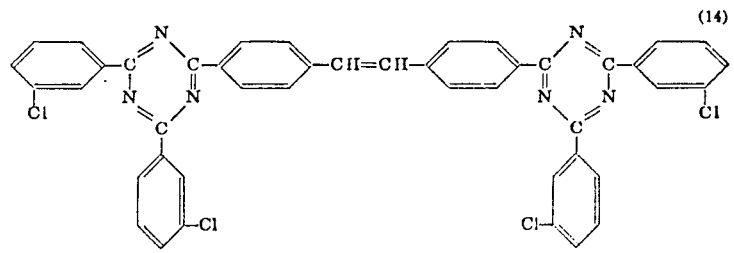

(14)

Yield (crude): 81.1% of the theoretical. Crystalline, yellow powder from ortho-dichlorobenzene, melting at 385 to 386° C.

$C_{44}H_{26}N_6Cl_4$, mol. weight, 780.55. Calculated: C, 67.71; H, 3.36; Cl, 18.17%. Found: C, 67.67; H, 3.31; Cl, 18.45%.

EXAMPLE 4

A polyester fabric (for example Dacron) is padded at room temperature (about 20° C.) with an aqueous dispersion containing per liter 2 g. of the compound of the Formula 8, 10 or 11 as well as 1 g. of an adduct prepared from about 8 mols of ethylene oxide and 1 mol of para-tertiary octyl-phenol, and then dried at about 100° C. The dry material is then subjected to a heat treatment at 150 to 220° C. which, according to the temperature used, takes from 2 minutes to a few seconds. The material treated in this manner has a much better white aspect than the untreated material.

EXAMPLE 5

100 parts of polyester granulate from terephthalic acid ethyleneglycol polyester are intimately mixed with 0.05 part of the stilbene derivative of the Formula 8, 10, 11 or 12 and fused at 285° C. with stirring. When the spinning mass is spun through conventional spinnerets, strongly brightened polyester fibers are obtained.

The compound of the Formula 8, 10, 11 or 12 may also be added to the starting material before or during the polycondensation leading to the polyester.

EXAMPLE 6

10,000 parts of a polyamide in chip form, prepared in known manner from hexamethylenediamine adipate, are mixed in a tumbler for 12 hours with 30 parts of titanium dioxide (rutile modification) and 10 parts of the compound of the Formula 8, 10 or 11. The chips treated in this manner are then melted in a boiler from which the atmospheric oxygen has been displaced by means of superheated steam and which is heated with oil or diphenyl vapour at 300 to 310° C., and the melt is stirred for half an hour and then expressed under a nitrogen pressure of 5 atmospheres (gauge) through a spinneret. The cooled filament is then reeled on a cheese. The filaments obtained in this manner display an excellent brightening effect which is fast to heat-setting and has good fastness to washing and light.

EXAMPLE 7

An intimate mixture of 100 parts of polyvinylchloride, 3 parts of stabilizer ("Advastat BD 100"; Ba/Cd complex), 2 parts of titanium dioxide, 59 parts by volume of dioctylphthalate and 0.01 to 0.1 part of the compound of the Formula 11 is rolled to and fro on a calender at 150 to 155° C. to form a foil. The resulting, very opaque polyvinylchloride foil has a much higher white content than a comparable foil prepared without addition of the bis-triazinylstilbene compound.

EXAMPLE 8

100 parts of polyethylene are rolled on a calender heated at 130° C. to form a homogeneous foil, into which 0.02 parts of the compound of the Formula 11 is slowly incorporated. When the optical brightener has attained even distribution in the foil, the latter is pulled off the calender and pressed in a press heated at 130 to 135° C. to form sheets. A strong brightening effect is obtained.

What is claimed is:

1. A 4,4'-bis-triazinylstilbene of the formula

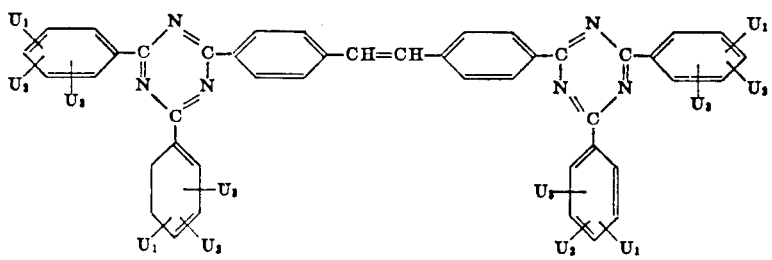

wherein $U_1$ represents a member selected from the group consisting of hydrogen, halogen, an alkyl group having 1 to 18 carbon atoms, an alkoxy group having 1 to 4 carbon atoms, a phenyl group, a sulfonic acid group, a sulfonamide group, a residue of the formula

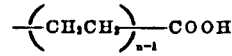

and a residue of the formula

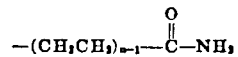

where $n$ is a whole number selected from 1 and 2, $U_2$ stands for a member selected from the group consisting of hydrogen, halogen, an alkyl group having 1 to 18 carbon atoms and an alkoxy group having 1 to 4 carbon atoms and $U_3$ stands for a member selected from the group consisting of hydrogen, halogen and alkyl group having 1 to 4 carbon atoms.

2. A 4,4'-bis-triazinylstilbene of the formula

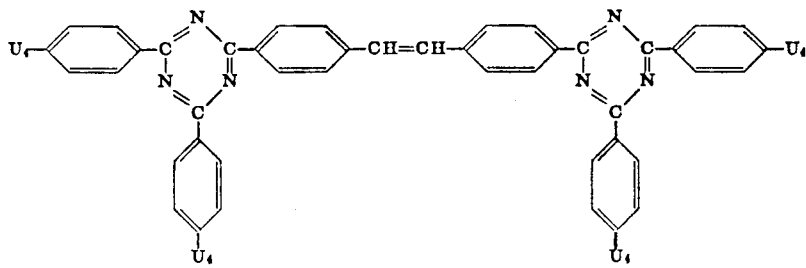

where $U_4$ represents a member selected from the group consisting of a hydrogen atom, a halogen atom, an alkyl group containing 1 to 8 carbon atoms and an alkoxy group containing 1 to 4 carbon atoms.

3. The compound of the formula
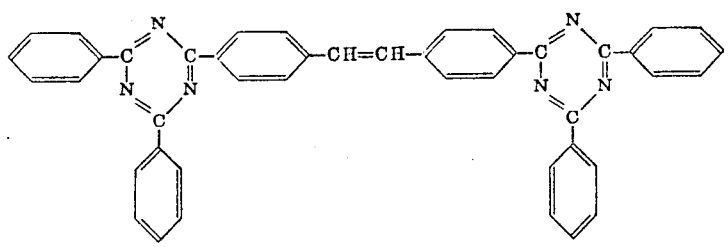
4. The compound of the formula
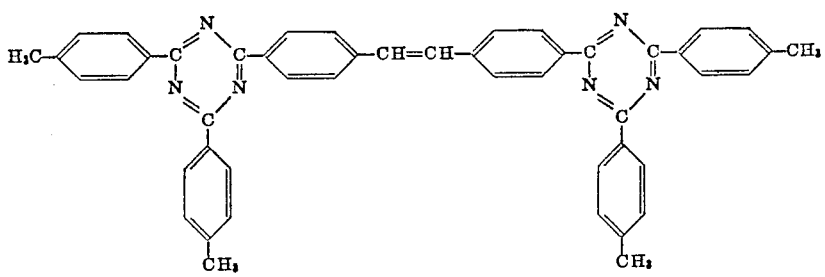
5. The compound of the formula
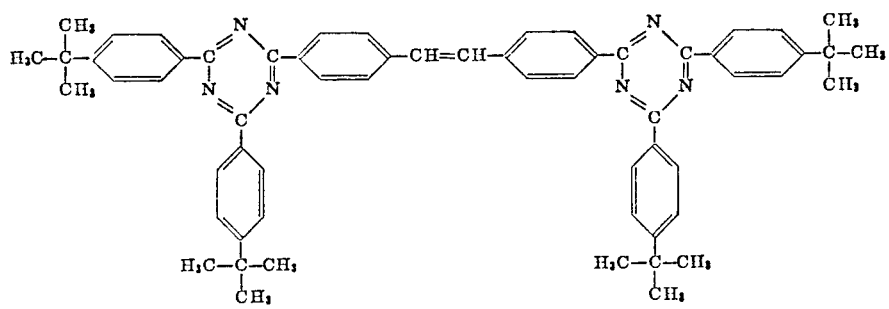
6. The compound of the formula
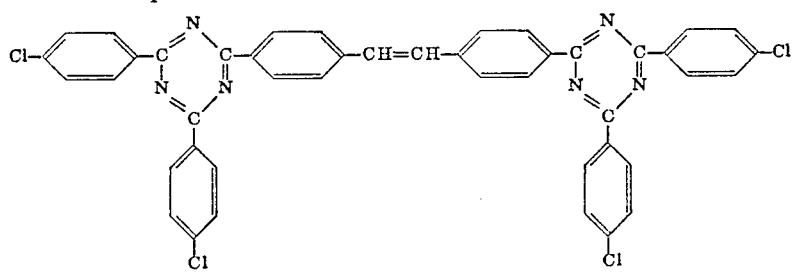
7. The compound of the formula
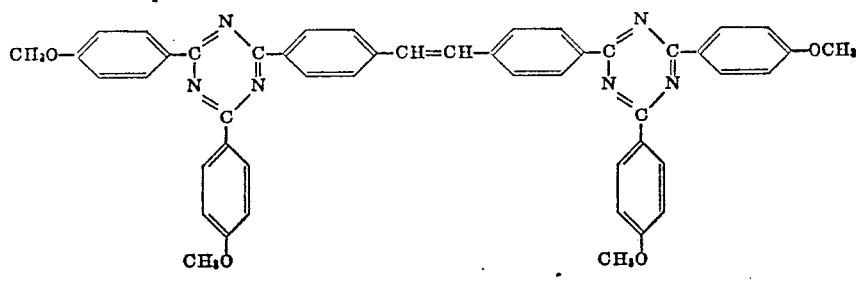
References Cited
FOREIGN PATENTS
641,529   4/1964   Belgium.
OTHER REFERENCES
Cook et al., J. Chem. Soc. 1941, pp. 278–282.
Smolin et al., "S-Triazines and Derivatives," pp. 156 and 157, Interscience Publishers Inc. (1959) (New York).
JOHN D. RANDOLPH, *Primary Examiner.*

UNITED STATES PATENT OFFICE
CERTIFICATE OF CORRECTION

Patent No. 3,351,592                          November 7, 1967

Adolf Emil Siegrist et al.

It is certified that error appears in the above identified patent and that said Letters Patent are hereby corrected as shown below:

Columns 11 and 12, the left-hand portion of the formula in claim 1 should appear as shown below:

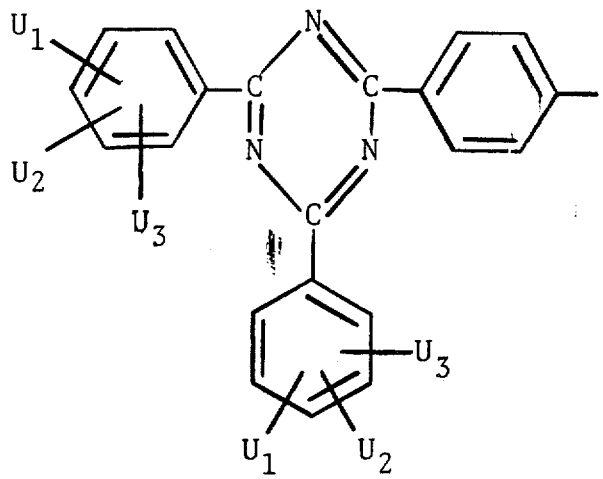

Signed and sealed this 3rd day of March 1970.

(SEAL)
Attest:

EDWARD M. FLETCHER, JR.                    WILLIAM E. SCHUYLER, JR.
Attesting Officer                             Commissioner of Patents